United States Patent
Shtivelman et al.

(10) Patent No.: US 11,023,393 B2
(45) Date of Patent: Jun. 1, 2021

(54) CONNECTIVITY TYPE DETECTION USING A TRANSPORT PROTOCOL AND COMMAND PROTOCOL OF THE DATA STORAGE SYSTEM

(71) Applicant: INTERNATIONAL BUSINESS MACHINES CORPORATION, Armonk, NY (US)

(72) Inventors: Olga Shtivelman, Karmiel (IL); Alon Marx, Matan (IL); Amalia Avraham, Petach Tikva (IL); Shay Berman, Modlin (IL)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 16/404,646

(22) Filed: May 6, 2019

(65) Prior Publication Data
US 2020/0356498 A1 Nov. 12, 2020

(51) Int. Cl.
*G06F 13/16* (2006.01)
(52) U.S. Cl.
CPC .. *G06F 13/1668* (2013.01); *G06F 2213/0008* (2013.01); *G06F 2213/0036* (2013.01)
(58) Field of Classification Search
CPC ......... G06F 13/00; G06F 13/1668; G06F 3/00
See application file for complete search history.

(56) References Cited

U.S. PATENT DOCUMENTS

| | | | |
|---|---|---|---|
| 3,996,564 A | 12/1976 | Kerrigan et al. | |
| 6,493,825 B1 | 12/2002 | Blumenau et al. | |
| 7,272,674 B1 | 9/2007 | Nandi et al. | |
| 7,568,056 B2 | 7/2009 | Danilak | |
| 7,702,762 B1 | 4/2010 | Jagana | |
| 8,005,013 B2 | 8/2011 | Teisberg et al. | |
| 8,918,537 B1 * | 12/2014 | Sandstrom | H04L 12/6418 709/238 |

(Continued)

OTHER PUBLICATIONS

Arslan, F., "How to Write a Container Storage Interface (CSI) Plugin", [online], [Retrieved from the Internet on Apr. 18, 2019], Retrieved from the Internet at <URL: https://arslan.io/2018/06/21/how-to-write-a-container-storage-interface-csi-plugin/>, 19 pp.

(Continued)

*Primary Examiner* — Tammara R Peyton
(74) *Attorney, Agent, or Firm* — Konrad Raynes Davda & Victor LLP

(57) ABSTRACT

Connectivity type detection for a data storage system in accordance with the present description includes, in one aspect of the present description, automated host-target discovery logic which is configured to automatically discover the connectivity type for a connection path between a host and a storage system, and select and initiate target discovery procedures which are appropriate for the discovered connectivity type. As a result, mapping a target volume of the target storage system which is connected to the host, may be facilitated, reducing or eliminating delays which may have otherwise resulted from the change in connectivity type. In this manner, efficiency of the computing system may be improved. Other aspects and advantages may be realized, depending upon the particular application.

22 Claims, 5 Drawing Sheets

(56) References Cited

U.S. PATENT DOCUMENTS

| | | | |
|---|---|---|---|
| 9,710,194 B1* | 7/2017 | Watson | G06F 3/0635 |
| 2011/0231541 A1* | 9/2011 | Murthy | H04L 69/32 709/224 |
| 2013/0238818 A1 | 9/2013 | Klein et al. | |

OTHER PUBLICATIONS

Doval, D., "Self-Organizing Resource Location and Discovery", Doctoer of Philispoy Thesis, University of Dublin, Trinity College, Sep. 30, 2003, 184 pp.

Freyensee, J., et al., "NVME-Connect-Connect to a Fabrics Controller", [online], Jan. 8, 2019, [Retrieved on Apr. 15, 2019], Retrieved from the Internet at <URL: https://www.mankier.com/1/nvme-connect>, 4 pp.

Hutchings, J., "Rescanning your SCSI Bus to See New Storage", [online], Mar. 25, 2013, [Retrieved on Apr. 15, 2019], Retrieved from the Internet at <URL: https://blogs.it.ox.ac.uk/oxcloud/2013/03/25/rescanning-your-scsi-bus-to-see-new-storage>, 4 pp.

IBM Corporation, "iSCSI Target Discovery for Linux Hosts", [online], [Retrieved on Apr. 30, 2019], Retrieved from the Internet at <URL: https://www.ibm.com/support/knowledgecenter/STKMQV_7.8.1/com.ibm.storage.vflashsystem9000.7.8.1.doc/svc_iscsilinuxtargetdisc_9y6n2w.html>, 3 pp.

Maniankara, A., "Understanding the Container Storage Interface (CSI)", [online], Aug. 12, 2018, [Retrieved on Apr. 15, 2019], Retrieved from the Internet at <URL: https://medium.com/google-cloud/understanding-the-container-storage-interface-csi-ddbeb966a3b>, 9 pp.

Netapp, Inc., "Discovering New SCSI Devices (LUNs) and Multipath Devices", [online], Jan. 2015, [Retrieved on Apr. 15, 2019], Retrieved from the Internet at <URL: https://library.netapp.com/ecmdocs/ECMP11694141/html/GUID-F02111E0-70B8-4EF6-BDF4-3CB4ED157D15.html>, 1 pp.

Netapp, Inc., "(iSCSI) Methods for Setting Up Target Discovery With Software Interiors", [online], Sep. 2014, [Retrieved on Apr. 15, 2019], Retrieved from the Internet at <URL: https://library.netapp.com/ecmdocs/ECMP1217221/html/GUID-FB80368C-D-183-4188-AC08-BCAC009C7902.html>, 1 pp.

VMware, Inc., "iSCSI Naming Conventions", [online], Last Updated Jun. 28, 2017, [Retrieved on Apr. 15, 2019], Retrieved from the Internet at <URL: https://docs.vmware.com/en/VMware-vSphere/5.5/com.vmware.vsphere.storage.docs/GUID-686D92B6-A2B2-4944-8718-F1F74F6A2C53.html>, 2 pp.

Wikipedia, "iSCSI", [online], Last Edited on Feb. 24, 2019, [Retrieved on Apr. 16, 2019], Retrieved from the Internet at <URL: https://en.wikipedia.org/wiki/ISCSI>, 9 pp.

Wikipedia, "Kubernetes", [online], Last Edited on Apr. 8, 2019, [Retrieved on Apr. 15, 2019], Retrieved from the Internet at <URL: https://en.wikipedia.org/wiki/Kubernetes>, 8 pp.

Wikipedia, "NVM Express", [online], Last Edited on Apr. 13, 2019, [Retrieved on Apr. 15, 2019], Retrieved from the Internet at <URL: https://en.wikipedia.org/wiki/NVM_Express>, 10 pp.

Wikipedia, "Scsi", [online], Last Edited on Mar. 16, 2019, [Retrieved on Apr. 15, 2019], Retrieved from the Internet 3t <URL: https://en.wikipedia.org/wiki/SCSI>, 8 pp.

Wikipedia, "Secure Shell", [online], Last Edited on Mar. 31, 2019, [Retrieved on Apr. 5, 2019], Retrieved from the Internet at <URL: https://en.wikipedia.org/wiki/Secure_Shell>, 10 pp.

* cited by examiner

CONNECTIVITY TYPE DETECTION USING A TRANSPORT PROTOCOL AND COMMAND PROTOCOL OF THE DATA STORAGE SYSTEM

BACKGROUND OF THE INVENTION

1. Field of the Invention

The present invention relates to a computer program product, system, and method for connectivity type detection for data storage systems.

2. Description of the Related Art

A storage system typically includes a storage controller and one or more data storage devices such as hard disk drives, solid state drives, tape drives, etc. The storage system is often connected to a host which hosts applications which issue input/output instructions or commands for writing data to or reading data from a storage subunit such as a volume, for example. One example of an open-source system for automating deployment, scaling and management of containerized applications in a cluster environment having multiple nodes of hosts and multiple storage systems, is a Kubernetes system, also stylized as a "k8s" system. A Kubernetes system typically has a container orchestrator that groups containers that make up an application into logical units to facilitate management and discovery.

In a Kubernetes system, to provide access to a particular volume by a particular host, operations are performed on the storage controller of a storage system, and on the host. For example, on the storage controller, a data structure representing a host is created, which identifies the host and a connection path including connection ports connecting the particular host to the storage controller. Once a volume is created in the storage system, the volume is "attached" to that host by the storage controller by defining a logical and physical path between the volume and the host.

On a node of hosts of the kubernetes system, operations are performed to "discover" target storage system which may contain volumes to be accessed by a host of the node. The target storage system discovery procedure run for the host depends upon the connectivity type of the connection path between the host and a storage system. A target storage system discovery procedure may depending upon the system, include a log-in component, and is accordingly referred to herein as a target storage system discovery/log-in procedure. Thus, if the connection path between the host and a storage system is of the iSCSI (Internet Small Computer Systems Interface) connectivity type, a target storage system discovery/log-in procedure tailored to that particular connectivity type is run to scan the iSCSI connection path and discover the storage system which is connected to the host with the iSCSI connection path. Similarly, if the connection path between the host and a storage system is of the NVMe (Non-Volatile Memory Express) connectivity type, a target storage system discovery/log-in procedure tailored to that particular connectivity type is run to scan the NVMe connection path discover the storage system which is connected to that host with a NVMe connection path. Other known target storage system discovery/log-in procedures are tailored to other connection path connectivity types such as FC (Fibre Connection), etc.

Having discovered a target storage system, a second procedure, referred to as a target volume discovery procedure may be run to discover volumes of a discovered target storage system, which have been attached by the target storage controller to that host. The target volume discovery procedure run for the host, like the target storage system discovery/log-in procedure, depends upon the connectivity type of the connection path between the host and the storage system which attached the volume to the host. Thus, if the connection path between the host and a storage system is of the iSCSI (Internet Small Computer Systems Interface) connectivity type, a target volume discovery procedure tailored to that particular connectivity type is run to rescan the iSCSI connection path and discover the volumes attached to that host by the storage system which is connected to that host with the iSCSI connection path. Similarly, if the connection path between the host and a storage system is of the NVMe (Non-Volatile Memory Express) connectivity type, a target volume discovery procedure tailored to that particular connectivity type is run to scan the NVMe connection path to rescan the NVMe connection path and discover the volumes attached to that host by the storage system which is connected to that host with the NVMe connection path. Other known target volume discovery procedures are tailored to other connectivity types such as FC (Fibre Connection), etc.

A computing system may have multiple hosts and multiple clusters of hosts in which hosts are added or removed as conditions warrant. Similarly, the computing system may have multiple storage systems which are added or removed as conditions warrant. Moreover, input/output operations being controlled by one host may be switch to another host within the cluster or to a host of an entirely different cluster. Thus, connection paths between hosts and storage systems and their volumes may also be added, removed or changed as hosts and storage systems are added, removed or changed and as I/O operations are shifted from one host to another. In known systems, the user needs to detail for each host and storage system combination the connectivity type of the host-storage system connection for the combination, which may be based upon iSCSI, NVMe, or FC or other connectivity types.

Each time a connection path to a host is added, removed or changed, the need often arises to again conduct target storage system discovery/log-in procedures to scan for and discover or rediscover the target storage systems to which a host is connected. However, each target system discovery procedure to discover or rediscover target storage systems connected to a host typically is configured to conform to the connectivity type of the connection path being scanned. Similarly, each target volume discovery procedure to discover or rediscover target volumes attached by target storage systems connected to a host must also be configured to conform to the connectivity type of the connection path being scanned. Thus, discovery procedures are frequently initiated and must conform each time to the connectivity type of the connection between the particular host and the target storage system providing the target volumes to be accessed by the host.

SUMMARY

Connectivity type discovery in accordance with the present description provides a significant improvement in computer technology. In one embodiment, in response to a discovery request, connectivity type discovery logic discovers the connectivity type of a host-target connection coupling a storage system to a host. Target discovery logic associated with the host, discovers the storage system as a function of the discovered connectivity type of the host-target connection. As described in greater detail below, connectivity type discovery in accordance with the present description can significantly improve responses to a change in connectivity type of host-to-target connection paths, and as a result, significantly improve system performance of a computer system having a data storage system.

In one aspect, the connectivity type discovery logic selects and initiates a target storage system discovery procedure for the target discovery logic, as a function of the discovered connectivity type of the first host-target connection. Accordingly, target discovery logic associated with the host, discovers a target storage system as a function of the discovered connectivity type of the first host-target connection. In this manner, discovery of a target storage system may be automated to reduce or eliminate user involvement, improving speed and efficiency of computer system operations. In one embodiment, discovering a storage system includes discovering the storage system as a target storage system on the host and logging in to the storage system from the host, as a function of the discovered connectivity type of the host-target connection.

In another aspect, connectivity type discovery logic selects and initiates a target volume discovery procedure for the target discovery logic, as a function of the discovered connectivity type of the first host-target connection. Accordingly, target discovery logic associated with the host, discovers a target volume on the discovered target storage system, as a function of the discovered connectivity type of the host-target connection. In this manner, discovery of a target volume may be automated to reduce or eliminate user involvement, further improving speed and efficiency of computer system operations.

Other aspects and advantages of connectivity type discovery in accordance with the present description are provided as described below.

DETAILED DESCRIPTION

Figure 1:
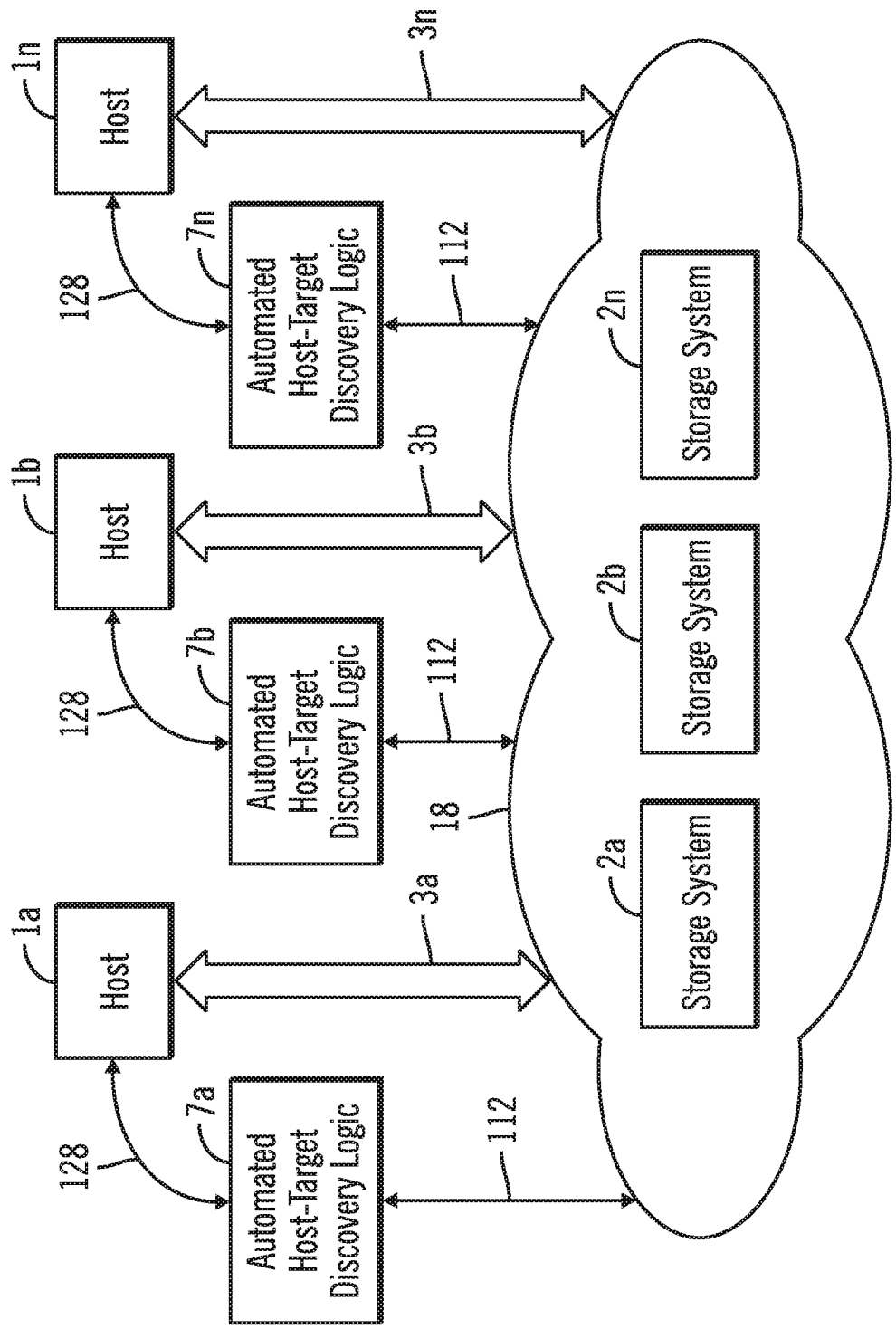
FIG. 1 illustrates an embodiment of a computing environment employing connectivity type detection for a data storage system in accordance with one aspect of the present description.

Automated connectivity type discovery for a computing system having a data storage system in accordance with the present description, provides a significant improvement in computer technology. As described in greater detail below, automated connectivity type discovery in accordance with the present description can significantly improve responses to a change in connectivity type of host-to-target connection paths, and as a result, significantly improve system performance of a computer system having a data storage system.

It is appreciated herein that known computing systems having a preconfigured discovery procedure for a particular connectivity type are relatively inflexible should the topology of the computing system change. For example, should a host or storage system be added or the connectivity type of an existing connection path change, it is frequently incumbent upon the user to know what the connectivity type of any new host-target connection path is. Moreover, new discovery procedures may have to loaded, installed and preconfigured for the new host, storage system or connection path. Installing and preconfiguring discovery procedures for a new connectivity type can add significant delays, leading to significant inefficiencies in the workload of the computing system.

In one aspect of the present description, automated host-target discovery logic is configured to automatically discover the connectivity type for a connection path, and select and initiate preloaded and preinstalled target discovery procedures which are appropriate for the discovered connectivity type. As a result, mapping a target volume of the target storage system which is connected to the host, may be facilitated, reducing or eliminating delays which may have otherwise resulted from the change in connectivity type. For example, target discovery procedures may be initiated without the need for user intervention or knowledge of the connectivity type of the particular host-target connection path. In this manner, efficiency of the computing system may be improved, particularly in heterogeneous computing system having various connection types between hosts and storage systems, and in dynamic computing systems in which components are frequently added or changed. Other aspects and advantages may be realized, depending upon the particular application.

A system of one or more computers may be configured for connectivity type detection for a data storage system in accordance with the present description, by virtue of having software, firmware, hardware, or a combination of them installed on the system that in operation causes or cause the system to perform write transfer resource management in accordance with the present description. For example, one or more computer programs may be configured to perform connectivity type detection for a data storage system by virtue of including instructions that, when executed by data processing apparatus such as for example a storage controller processor, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Figure 2:
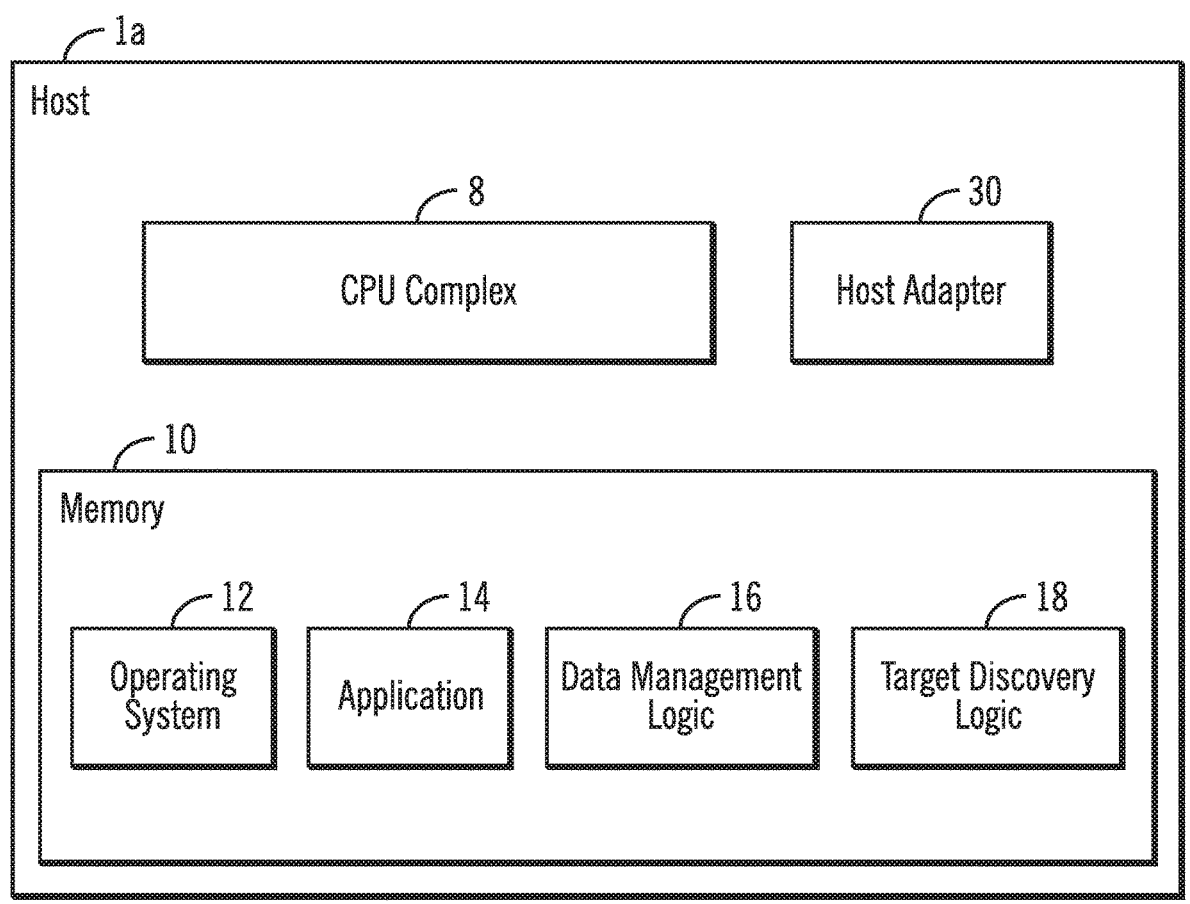
FIG. 2 illustrates an example of a host of the computing environment of FIG. 1, employing connectivity type detection for a data storage system in accordance with one aspect of the present description.
Figure 3:
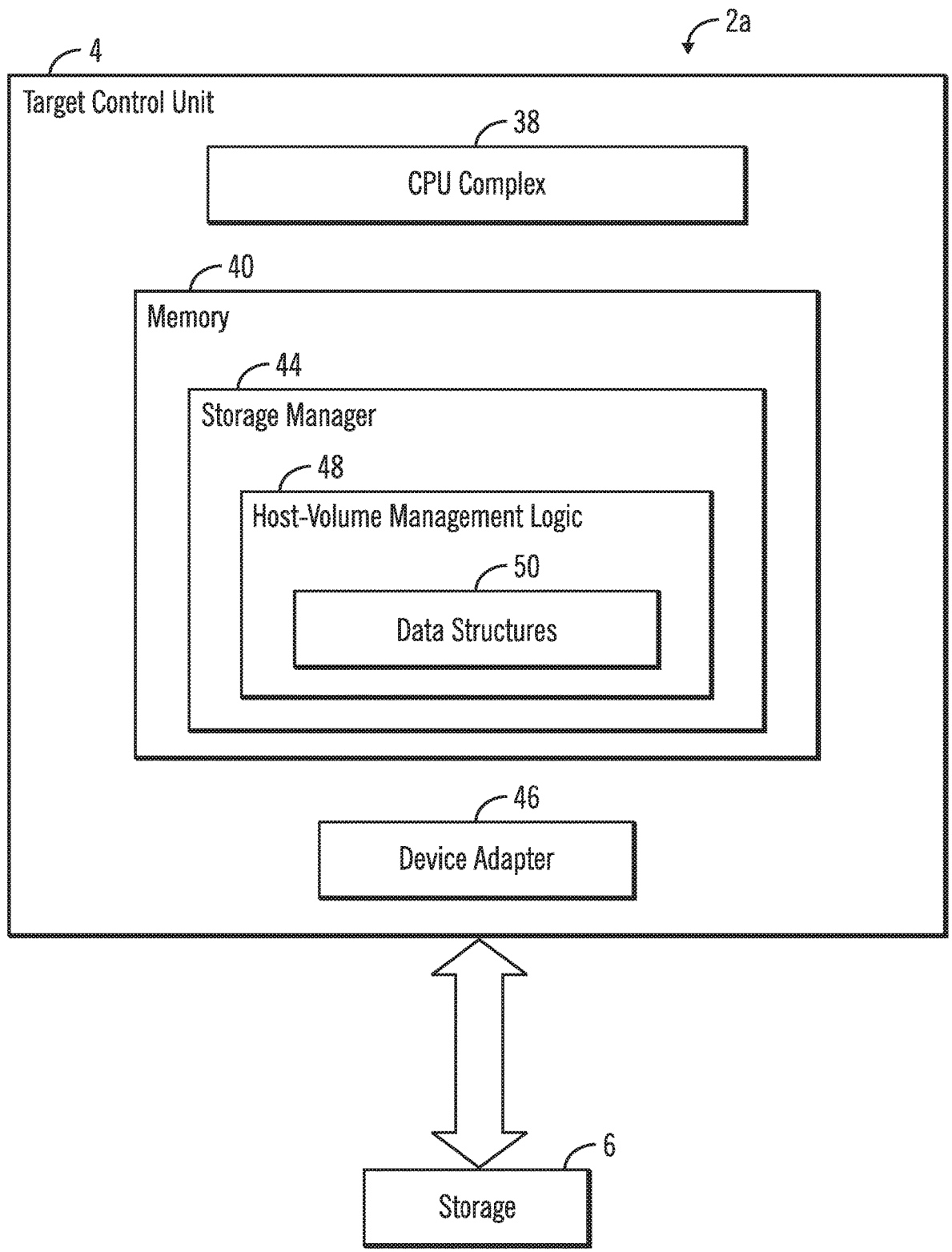
FIG. 3 illustrates an example of a storage controller of the computing environment of FIG. 1, employing connectivity type detection for a data storage system in accordance with one aspect of the present description.

FIGS. 1-3 illustrate an embodiment of a computing environment employing connectivity type detection for a data storage system in accordance with the present description. In this example, the computing environment includes a Kubernetes system for automating application deployment and management. Applications (also referred to as workloads) running on a plurality of hosts 1a (FIGS. 1, 2), 1b . . . 1n may submit Input/Output (I/O) requests to one or more data storage devices or systems 2a, 2b, . . . 2n to read or write data over host-target connection paths 3a, 3b . . . 3n, respectively between each host and an associated data storage system. Each host 1a (FIGS. 1, 2), 1b . . . 1n may be a node of the Kubernetes system and may include a server or a cluster of servers, for example. It is appreciated that connectivity type detection in accordance with the present description may be applied to other types of computing systems having changing host-storage system connections or changing workload hosting, for example.

Each data storage system 2a (FIGS. 1, 3), 2b . . . 2n includes a storage controller or target control unit as represented by the storage controller 4 (FIG. 3) which accesses user data and metadata stored in one or more data storage units of storage 6 in response to an I/O request from a host. In one aspect of automated discovery in accordance with the present description, each host 1a, 1b, . . . 1n and its associated storage system 2a, 2b . . . 2n, respectively, has associated automated host-target connectivity type discovery logic 7a, 7b . . . 7n (FIG. 1) employing connectivity type detection in accordance with the present description, which functions as a mediator to automate target storage system and target volume discovery procedures as a function of discovered connectivity types of the connection paths 3a, 3b . . . 3n. As explained in greater detail below, such automated discovery procedures selected and performed as a function of discovered connectivity types, can significantly facilitate mapping hosts to storage volumes for I/O operations.

Kubernetes systems typically have a Container Storage Interface (CSI) Controller that is responsible for controlling and managing volumes, such as creating, deleting, attaching/detaching, snapshotting, etc. volumes within the context of the host nodes. Accordingly, in one embodiment, automated host-target discovery logic 7a, 7b . . . 7n may each be implemented in one or more CSI controllers which have been modified to perform automated discovery in accordance with the present description. If so, each CSI controller so modified may be implemented as a plug-in module, for example, of a node of the Kubernetes system such as a node of the host or hosts 1a. Alternatively, the automated host-target discovery logic 7a, 7b . . . 7n may be separate physical devices or may be virtual devices implemented using assigned resources of partitions one or more servers of a host or a storage controller, for example. For example, a management server such as a Spectrum Connect system that is connected both to the host and to the storage system may be modified to implement an automated host-target discovery logic 7a, 7b . . . 7n. The hosts 1a, 1b . . . 1n may also be separate physical devices or may be virtual devices implemented using assigned resources of partitions of a server, for example. In a similar manner, the target control units 4 of the data storage systems 2a, 2b . . . 2n may be separate physical devices or may be virtual devices implemented using assigned resources of partitions one or more servers, for example.

In the illustrated embodiment, one or more of the data storage systems 2a, 2b . . . 2n is a data backup systems which can provide continuous availability of production data in the event of a sudden catastrophic failure at a single point in time or data loss over a period of time. Different data replication technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror Copy. Although FIG. 1 depicts a data backup system, it is appreciated that a computing environment employing connectivity type detection for a data storage system in accordance with the present description may be applied to any computer system providing data storage.

A typical host as represented by the host 1a of FIG. 2 includes a CPU complex 8 and a memory 10 having an operating system 12, an application 14 and data management logic 16 that cooperate to read data from and write data updates to the storage 6 (FIG. 3) via a target control unit as represented by the storage controller 4 (FIG. 3). As explained in greater detail below, a target discovery logic 18 of each host 1a, 1b . . . 1n, is responsive to an associated automated host-target discovery logic 7a, 7b . . . 7n to perform target storage system and target volume discovery procedures selected by the associated host-storage discovery logic to map a volume of storage 6 (FIG. 3) to the particular host. An example of a suitable operating system is the z/OS operating system. It is appreciated that other types of operating systems may be employed, such as a distribution of Linux, for example, depending upon the particular application.

The I/O requests may be transmitted to the data storage systems 2a, 2b . . . 2n over communication paths 3a, 3b . . . 3n (FIG. 1), respectively, of one or more networks which may include one or more data links and switches of a connection fabric to provide the connection paths through the connection fabric between a selected host 1a, 1b . . . 1n and a selected target such as a data storage system 2a, 2b . . . 2n. Each host 1a, 1b . . . 1n has one or more host adapters 30 (FIG. 2) which connects a host to a communication path 3a, 3b, . . . 3n which may be part of a network or network fabric which may comprise a Storage Area Network (SAN), Local Area Network (LAN), Intranet, the Internet, Wide Area Network (WAN), peer-to-peer network, wireless network, arbitrated loop network, etc.

In the illustrated embodiment, each communication path 3a, 3b, . . . 3n (FIG. 1) includes multiple components including a transport component often referred to as a transport layer or protocol, and a command component often referred to as a command layer or protocol. Examples of a transport component of a communication path of the communication paths 3a, 3b . . . 3n, include transport protocols such as zHyperlink, Fibre Channel Protocol (FCP), Fibre Connection (FICON), a Fibre Channel arbitrated loop configuration, a serial loop architecture, Transmission Control Protocol and Internet Protocol (TCP/IP) or a bus interface, such as a Peripheral Component Interconnect (PCI) interface such as a PCI-Express interface Other types of transport components for communication paths may be utilized, such as a modem telephone path, wireless network, etc., depending upon the particular application. Examples of a command component of a communication or connection path of the connection paths 3a, 3b . . . 3n, include command protocols such as SCSI, iSCSI, NVMe, etc. Other types of command protocols may be used depending upon the particular application.

The hosts 1a, 1b . . . 1n, the target control units 4 controlling storage devices 6 of the storage systems 2a, 2b . . . 2n, and the host-target discovery logic 7a, 7b . . . 7n may each be implemented using any computational device which has been modified for automated connectivity discovery in accordance with the present description. Computational devices suitable for modification as described herein include those presently known in the art, such as, a personal computer, a workstation, a server, a mainframe, a hand held computer, a palm top computer, a telephony device, a network appliance, a blade computer, a processing device, etc. The hosts 1a, 1b . . . 1n, the target control units 4 of the storage systems 2a, 2b . . . 2n, and the host-target discovery logic 7a, 7b . . . 7n, may be elements in any suitable network, such as, a storage area network, a wide area network, the Internet, an intranet, or elements in a cloud computing environment.

It is appreciated that one or more data storage units of the storage 6 of the storage systems 2a, 2b . . . 2n, may comprise any suitable device capable of storing data in a nonvolatile manner, such as hard drives, solid state drives, tape drives, etc., known in the art. Thus, in one embodiment, the storage 6 may be comprised of one or more sequential access storage devices, such as hard disk drives and magnetic tape drives or may also include non-sequential access storage devices such as solid state drives (SSD), for example. Such additional devices of storage 6 may comprise a single sequential or non-sequential access device for data storage or may comprise an array of devices for data storage, such as a Just a Bunch of Disks (JBOD), Direct Access Storage Device (DASD), Redundant Array of Independent Disks (RAID) array, virtualization device, tape storage, flash memory, etc.

In certain embodiments additional storage units may be disks, for example, that are configured as a Redundant Array of Independent Disk (RAID) storage arrays in which one or more RAID storage array is an array of hard disks in a RAID configuration to facilitate data recovery in the event of loss of a hard disk. RAID storage units of the storage 6 may also be other types of storage such as solid state drives in a RAID configuration to facilitate data recovery in the event of loss of a solid state drive. The storage units of the storage 6 may be configured to store data in subunits of data storage such as volumes, tracks, extents, blocks, pages, segments, cylinders, etc. Although automated connectivity type discovery in accordance with the present description is described in connection with storage subunits such as volumes, it is appreciated that automated connectivity type discovery in accordance with the present description is applicable to other storage subunits such as tracks, extents, blocks, pages, segments, cylinders, etc.

Each target control unit 4 (FIG. 3), of the storage systems 2a, 2b . . . 2n, of the illustrated embodiment, includes a CPU complex 38 (FIG. 3) having processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each target control unit 4 (FIG. 3), of the storage systems 2a, 2b . . . 2n, further has a memory 40 that includes a storage manager 44 configured to, in a known manner, manage storage operations including writing data to or reading data from a storage unit of an associated storage 6 in response to an I/O data request from a host or mirrored data from another data storage system. In the illustrated embodiment, the memory 40 includes host-volume management logic 48 which is configured to, in a known manner, generate a data structures 50 having fields representing a host and the volumes of the storage system which are attached to that host. In addition, the data structures 50 have fields containing data by which the connectivity type of the connection path coupling the host to the storage system, may be identified, as described herein.

Each target control unit 4 (FIG. 3), of the storage systems 2a, 2b . . . 2n, has one or more device adapters 46 (FIG. 3) which connects a target control unit to a connection path 3a, 3b . . . 3n. The storage manager 44 includes appropriate storage device drivers to configure associated storage 6.

The CPU complex 38 of each target control unit 4 (FIG. 3), 4a, 4b may have multiple clusters of processors, each cluster having its own assigned memory 40, storage manager 44, cache, etc. The processing and memory resources assigned each cluster may be physical, virtual, shared, transferrable or dedicated, depending upon the particular application.

Figure 4:
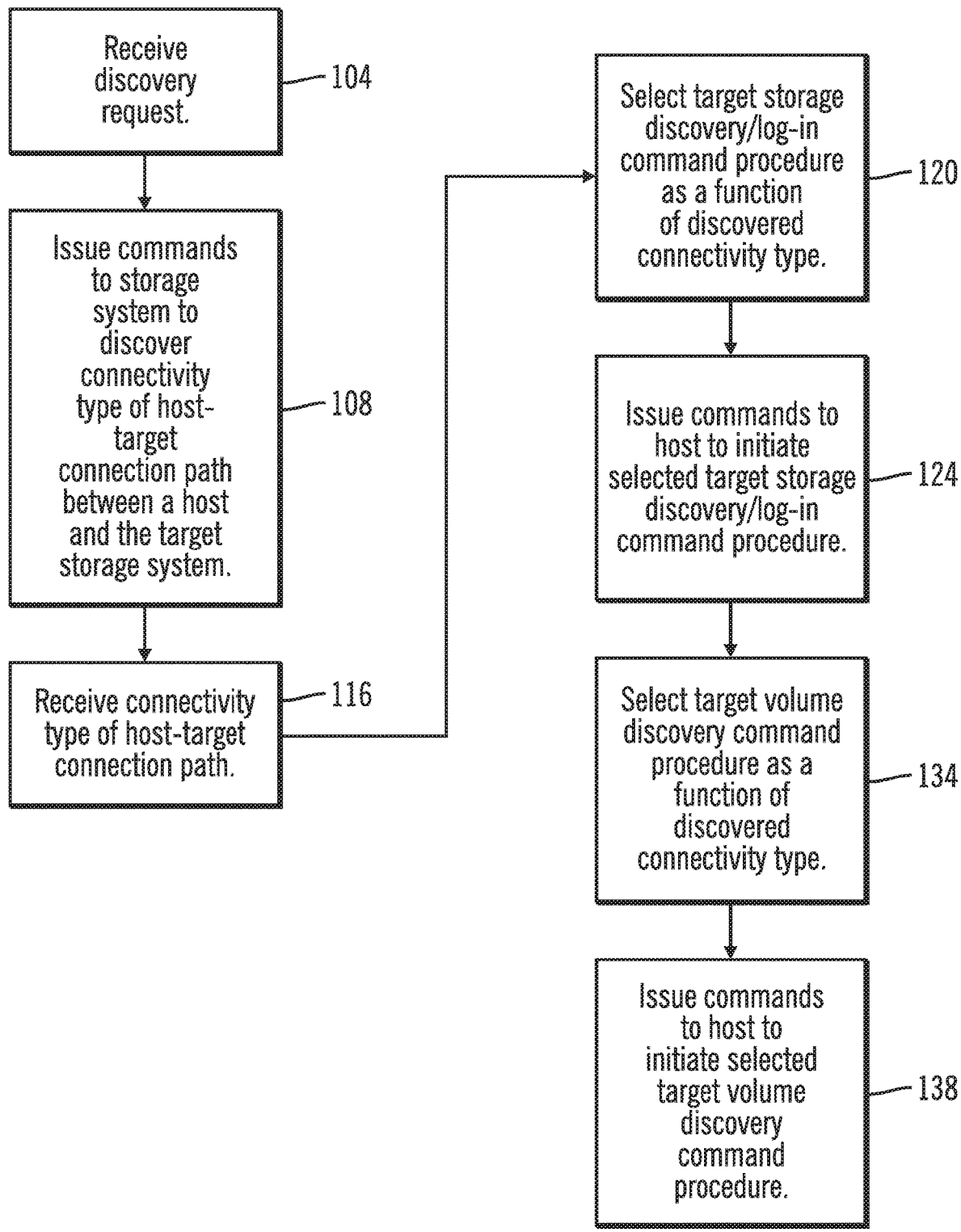
FIG. 4 illustrates an example of operations of components of the computing environment of FIG. 1, employing connectivity type detection for a data storage system in accordance with one aspect of the present description.

FIG. 4 depicts one example of automated operations of a host-target discovery logic such as the automated host-target discovery logic 7a (FIG. 1), for example, which facilitates mapping a target volume of a target storage system such as the storage system 2a, which is connected to a host such as the host 1a. It is appreciated that the connection type of a connection path connecting the storage system 2a to the host 1a, may be new or may have changed, for example. As such, target discovery procedures for the host 1a which are tailored for a particular connectivity type, may no longer be the appropriate target discovery procedures for the new or changed connectivity type of the connection path 3a between the host 1a and storage system 2a. Previously in known systems, a user was frequently required to manually enter into the system the particular connectivity type for each host-target connection path to ensure the proper target discovery procedure is run for each host-target connection path.

By comparison, in one aspect of connectivity type discovery in accordance with the present description, the automated host-target discovery logic 7a (FIG. 1), is configured to automatically discover the connectivity type for the connection path 3a, and select and initiate target discovery procedures which are appropriate for the discovered connectivity type. As a result, mapping a target volume of the target storage system 2a which is connected to the host 1a, may be facilitated, reducing or eliminating delays which may have otherwise resulted from the change in connectivity type. In this manner, efficiency of the computing system may be improved.

In this example, using known techniques, data structures 50 (FIG. 3) representing a host such as the host 1a, for example, is created on a target storage controller such as the target storage controller 4 (FIG. 3) of the storage system 2a (FIG. 1). In this embodiment, the data structures 50 of the storage system 2a contain data which identify the host 1a connected to the storage system 2a, the ports by which the host 1a is connected to the storage system 2a, and the connectivity type of the host-target connection path 3a connecting the host 1a to the target storage system 2a.

Also, using known techniques, a volume is created on a storage system such as the storage system 2a and the created volume is "attached," that is mapped to a connected host such as the host 1a to permit I/O operations from the host 1a to be directed to that volume. However, before the host can access the volume which has been attached to that host by the storage controller which controls that volume, the host or other logic associated with the node of the host, performs operations to "discover" any target storage systems which may contain volumes to be accessed by the host. The proper target storage system discovery/lag-in procedure to be run for the host should conform to the connectivity type of the connection path between the host and the storage systems to be discovered. If not, the target storage system discovery/log-in procedure may fail. Thus, in known computing systems, if the connection path between the host and a storage system to be discovered is of the SCSI (Small Computer Systems Interface) over FC (Fibre Channel) connectivity type, for example, a target storage system discovery/log-in procedure which is preconfigured for that particular connectivity type should be run to scan for and discover any storage systems connected to the host via the SCSI/FC type connection path. Similarly, if the connection path between the host and a storage system is of the NVMe (Non-Volatile Memory Express) over Ethernet connectivity type, for example, a target storage system discovery/log-in procedure tailored to that particular connectivity type should be run to scan for and discover any storage systems connected to the host via the NVMe/Ethernet type connection path.

In known computing systems, having discovered a target storage system, the host performs additional operations to discover volumes of a discovered target storage system, which have been attached by the target storage controller to that host. In known computing systems, target volume discovery procedures, like the target storage system discovery/log-in procedures, are preconfigured for a particular connectivity type of a connection path between the host and the storage system which attached the volume to the host. Thus, if the connection path between the host and a storage system is of the SCSI (Small Computer Systems Interface) over FC (Fibre Channel) connectivity type, for example, a target volume discovery procedure which is preconfigured for that particular connectivity type should be run to scan for and discover any volumes attached to that host by the discovered target storage system. Similarly, if the connection path between the host and a storage system is of the NVMe (Non-Volatile Memory Express) over Ethernet connectivity type, for example, a target volume discovery procedure tailored to that particular connectivity type should be run to scan for and discover any volumes attached to that host by the discovered target storage system.

It is appreciated herein that known computing systems having a preconfigured discovery procedure for a particular connectivity type are relatively inflexible should the topology of the computing system change. For example, should a host or storage system be added or the connectivity type of an existing connection path change, new discovery procedures may have to installed and preconfigured for the new host, storage system or connection path. Installing and preconfiguring discovery procedures for a new or changed component can add significant delays, leading to significant inefficiencies in the workload of the computing system.

In one aspect of the present disclosure, in response to a discovery request (block 104, FIG. 4) received by an automated host-target discovery logic such as the logic 7a of FIG. 1, for example, the host-target discovery logic 7a is configured to automatically issue (block 108. FIG. 4) commands over a connection path 112 from the host-target discovery logic 7a to the storage system 2a, to discover the connectivity type of the connection path 3a coupling the host 1a to the storage system 2a. In one embodiment, the automated host-target discovery logic 7a may have a command interface such as an Application Programming Interface (API)-like Secure Shell (ssh) or similar capability to run commands on a storage system connected by a connection 112 to the host-target logic 7a.

In one embodiment, a discovery request may be in the form of a request from an orchestrator to attach a specified volume to a specified host. Such a request typically is accompanied by details concerning the volume and the storage system to which it belongs. However, it is appreciated herein that the request from the orchestrator typically does not provide any or sufficient information identifying the connectivity type of the connection between the host and the specified storage system. In one aspect of connectivity type discovery in accordance with the present description, in response to such a discovery request (block 104, FIG. 4) received from an orchestrator by an automated host-target discovery logic such as the logic 7a of FIG. 1, for example, the host-target discovery logic 7a is configured to automatically issue (block 108. FIG. 4) commands over a connection path 112 from the host-target discovery logic 7a to the storage system 2a, to discover the connectivity type of the connection path 3a coupling the host 1a to the storage system 2a. For example, the details provided by the orchestrator concerning the volume and the storage system to which it belongs to, are sufficient to enable the host-target discovery logic 7a to automatically issue (block 108. FIG. 4) commands over a connection path 112 from the host-target discovery logic 7a to the storage system 2a, to discover the connectivity type of the connection path 3a coupling the host 1a to the storage system 2a.

In one embodiment, a discovery request may be generated by a host such as the host 1a, in response to a workload running on the host encountering a need to access a volume which has not yet been mapped by the host. It is appreciated that a discovery request in accordance with the present description, may be generated in response to a variety of different events, depending upon the particular application.

Such discovery request triggering events may include events such as, for example, the addition, changing or moving of a host, storage system, connection path, volume, workload or other component of the computing system. For example, a workload may be moved from one host to another, triggering a discovery request to the associated host-target discovery logic 7a, 7b, . . . 7n. Hence, the computing system of FIG. 1 is a dynamic system in which components such as hosts, storage systems, connection paths and workload locations, change from time to time.

In this example, the computing system of FIG. 1 is also a mixed or heterogeneous cluster environment in which a host such as the host 1a has a z/OS operating system, for example, and another host such as the host 1b has an X86 operating system, such as Linux, for example. In addition, the host-target connection paths 3a, 3b, . . . 3n may have different connectivity types. For example, a host-target connection path such as the connection path 3a, may have a connectivity type which includes a SCSI command component, for example, over a Fibre Channel transport component, for example, (also represented as SCSI/FC). Fibre Channel is a Storage Area Network (SAN) protocol which can encapsulate another protocol such as SCSI to provide the connectivity type SCSI/FC. By comparison, the X86 host 1b may have a host-target connection path such as the connection path 3b, which has a connectivity type which includes an iSCSI command component, for example, over a TCP/IP transport component, for example, (also represented as iSCSI/Ethernet). iSCSI is also a Storage Area Network (SAN) protocol in which the TCP/IP or Ethernet protocol encapsulates another protocol such as SCSI to provide the connectivity type iSCSI/Ethernet. Yet another host such as the host 1n, may have a z/OS operating system and a host-target connection path such as the connection path 3n, which has a connectivity type which includes a NVMe command component, for example, over a Fibre Channel transport component, for example, (represented as NVMe/FC). In this example, Fibre Channel is a Storage Area Network (SAN) protocol which encapsulates the NVMe protocol to provide the connectivity type NVMe/FC. It is appreciated that a computer system employing automated connectivity type discovery in accordance with the present description may have other command component and transport component combinations of connectivity type, depending upon the particular application.

In this example, a data structure of the data structures 50 (FIG. 3) created on the target storage system 2a identifies the connectivity type of the host-target connection path 3a connecting the host 1a to the target storage system 2a, as an SCSI/FC connectivity type. For example, the data structures 50 created on the target storage system 2a and representing the host 1a may identify an identification number of the storage controller (or a port) of the target storage system 2a with a World Wide Number (WWN) identification number in accordance with the Fibre Channel (FC) transport component of the connectivity type of the host-target connection path 3a. In addition, the data structures 50 may identify the storage controller 4 of the storage system 2a as a SCSI type storage controller, in accordance with the SCSI command component of the host-target connection path 3a. It is appreciated that the connectivity type of a host-target connection path may be identified by logic such as the logic 7a, using a variety of techniques, depending upon the particular application.

In response to the connectivity type discovery commands issued (block 108, FIG. 4) to the storage system 2a, an identification of the connectivity type of the host-target connection path 3a is reported back by host-volume management logic 48 (FIG. 3) of the storage system 2a, which is received (block 116. FIG. 4) by the requesting host-target discovery logic 7a. In this example, the connectivity type of the connection path 3a is reported back to the host-target discovery logic 7a as the SCSI/FC connectivity type. In response to receipt of the identification of the connectivity type of the host-target connection path 3a, the automated host-target discovery logic 7a is configured to select (block 120, FIG. 4) a target storage system discovery command procedure which is appropriate for the reported connectivity type. In this example, the host-target discovery logic 7a selects the target storage system discovery command procedure which is appropriate for the SCSI/FC connectivity type of the host-target connection path 3a as reported by the storage system 2a. It is appreciated that a target storage system discovery command procedure includes in some embodiments, two components, one component which discovers the target storage system on the host, and another component which logs in to the target storage system from the host. It is further appreciated that in some embodiments, a target storage system discovery command procedure may exclude one of these components. Thus, a target storage system discovery command procedure is referred to herein generally as a target storage system discovery/log-in command procedure which in accordance with the present description, is selected as a function of a discovered connectivity type of a host-target connection.

The host-target discovery logic 7a is configured to automatically issue (block 124, FIG. 4) commands over a connection path 128 (FIG. 1) from the host-target discovery logic 7a to the host 1a, to initiate the selected target storage discovery command procedure which is appropriate for the SCSI/FC connectivity type of the host-target connection path 3a as reported to the host-target discovery logic 7a by the storage system 2a. In one embodiment, the automated host-target discovery logic 7a may have an API-like ssh or similar ability to run commands on a host connected by a connection 128 to the host-target logic 7a.

As noted above, the automated host-target discovery logic 7a may be external to or internal within a host such as the host 1a. Accordingly, as used herein, issuance (block 124, FIG. 4) of commands over a connection path 128 (FIG. 1) from the host-target discovery logic 7a to the host 1a includes issuance of commands from a host-target discovery logic 7a external to the host 1a, and also issuance of commands from a host-target discovery logic 7a internal to the host 1a.

In this embodiment, target discovery logic 18 (FIG. 2) associated with a host 1a is configured to perform host-to-target discovery operations. In a Kubernetes environment, host-to-target discovery operations of the target discovery logic 18 (FIG. 2) may be performed by another plug-in, that is, a CSI node plug-in for the node of the host 1a. In this embodiment, a CSI node plug-in is modified as appropriate for automated connectivity type discovery in accordance with the present invention. For example, the host-to-target discovery procedures performed by a CSI node plug-in may be configured to be automatically triggered by the host-target discovery logic 7a discovery of the connectivity type of the host-target connection path 3a. In one embodiment, the CSI node plug-in runs in a Kubernetes node such as the node of the host or hosts 1a, for example. The CSI node plug-in and the CSI controller plug-in may be separate or combined in one plug-in, depending upon the particular application. It is appreciated that the location and topology of such plug-ins may vary, depending upon the particular application.

In one embodiment, a CSI node plug-in for the host 1*a* may be modified in accordance with the present description to maintain a collection of selectable, preloaded, preinstalled and preconfigured target storage discovery/log-in command procedures for each of the connectivity types likely to be discovered by the host-target discovery logic 7*a*. In this manner, the preconfigured target storage system discovery/log-in command procedure selected by the host-target discovery logic 7*a* may be readily triggered by the host-target discovery logic 7*a* and executed by the CSI node plug-in of the host 1*a* without incurring delays in preconfiguring or loading and installing a new target storage system discovery/log-in command procedure in response to a change in connection path connectivity type, for example.

In response to the host running the selected target storage system discovery/log-in procedure which has been preconfigured for the SCSI-FC connectivity type, the host 1*a* discovers any storage systems connected to the host via the SCSI/FC type connection path. For example, for a Fibre Channel transport protocol having a Fibre Channel-Arbitrated Loop (FC-AL) initiator, the initiator such as a host uses the LIP (Loop initialization Protocol) to interrogate each device port for its WWN (World Wide Name). In this example, the host 1*a* discovers the storage system 2*a* connected to the host 1*a* by the connection path 3*a* having the SCSI/FC connectivity type as determined by the host-target discovery logic 7*a* as described above.

As noted above, Fibre Channel is a Storage Area Network protocol which encapsulates the SCSI protocol in this example. In various SCSI transport protocols, there is an automated process for the discovery of SCSI devices and their identifications often referred to as Logical Unit Numbers (LUNs). Thus, in computer storage, a logical unit number, or LUN, is a number used to identify a logical unit, which is a device addressed by the SCSI protocol or Storage Area Network protocols which encapsulate SCSI, such as Fibre Channel or iSCSI. A LUN may be used with any device which supports read/write operations, such as a tape drive, but is most often used to refer to a logical disk or other storage as created on a SAN. Though not technically correct, the term "LUN" is often also used to refer to the logical disk or storage itself.

In this example, an initiator (such as the host 1*a* through its host adapter) scans or rescans a SCSI bus to "walk the loop" to determine what devices are connected and then assigns each one a 7-bit "hop-count" value. An example of such a SCSI target storage system discovery/log-in procedure includes a rescan script which is in the sg3_utils package that is part of a Linux OS distribution. For example, to discover new SCSI devices (identified by LUNs) and create the corresponding multipath devices for the LUN identified devices, a tool such as /usr/bin/rescan-scsi-bus.sh may be executed. To verify a DM (Device Mapper)-Multipath configuration, the tool multipath-ll may be used. Device-Mapper Multipath (DM-Multipath) is a Linux native multipath tool, which allows configuration of multiple I/O paths between a server node (host) and a storage array (storage systems) into a single device. These I/O paths are physical SAN connections that can include separate cables, switches, and controllers. Multipathing aggregates the I/O paths, creating a new device that consists of the aggregated paths.

Also in response to receipt of the identification of the connectivity type of the host-target connection path 3*a*, the automated host-target discovery logic 7*a* is configured to automatically select (block 134, FIG. 4) a target volume discovery command procedure which is appropriate for the reported connectivity type. In this example, the host-target discovery logic 7*a* selects the target volume discovery command procedure which is appropriate for the SCSI/FC connectivity type of the host-target connection path 3*a* as reported by the storage system 3*a*.

The host-target discovery logic 7*a* is configured to automatically issue (block 138, FIG. 4) commands over the connection path 128 (FIG. 1) from the host-target discovery logic 7*a* to the host 1*a*, to initiate the selected target volume discovery command procedure which is appropriate for the SCSI/FC connectivity type of the host-target connection path 3*a* as reported to the host-target discovery logic 7*a* by the storage system 2*a*. In one embodiment, the target discovery logic 18 (FIG. 2) associated with the host 1*a* may maintain a collection of selectable, preloaded, preinstalled and preconfigured target volume discovery command procedures for each of the connectivity types likely to be discovered by the host-target discovery logic 7*a*. In this manner, the preconfigured target volume discovery command procedure selected by the host-target discovery logic 7*a* may be readily executed by target discovery logic 18 associated with the host 1*a*, such as a CSI node plug-in of the node of the host 1*a*, without incurring delays in preconfiguring or loading and installing a new target volume discovery command procedure in response to a change in connection path connectivity type, for example.

As noted above, the automated host-target discovery logic 7*a* may be external to or internal within a host such as the host 1*a*. Accordingly, as used herein, issuance (block 138, FIG. 4) of commands over a connection path 128 (FIG. 1) from the host-target discovery logic 7*a* to the host 1*a* includes issuance of commands from a host-target discovery logic 7*a* external to the host 1*a*, and also issuance of commands from a host-target discovery logic 7*a* internal to the host 1*a*. Moreover, procedure selection (block 120) and initiation (block 124) for storage target discovery/log-in and procedure selection (block 134) and initiation (block 138) for target volume discovery, are depicted for clarity purposes in FIG. 4 as separate operations. However, it is appreciated that these operation may be performed in a single operation or may be performed in one or more separate operations, depending upon the particular application.

In response to the host executing the selected target volume discovery procedure which has been preconfigured for the SCSI/FC connectivity type, the host 1*a* discovers any volumes which have been attached to the host 1*a* by the discovered storage system 2*a* connected to the host 1*a* via the SCSI/FC type connection path 3*a*. In this example, volumes may be discovered using target volume discovery procedures preconfigured for an SCSI/FC connectivity type. Such SCSI/FC target volume discovery procedures may include use of a DM-Multipath tool as described above for SCSI target devices. For FC connectivity, a rescan command may be utilized. Having discovered the volumes attached to the host 1*a*, the host 1*a* maps the discovered attached volumes to the host 1*a* and initiates use of the mapped volumes for I/O operations.

Automated operations for the host-target discovery logic 7*b* and 7*n* may be performed for associated host or host clusters 1*b* and 1*n*, respectively, in a manner similar to that described above in connection with host-target discovery logic 7*a*. However, the procedure selection (block 120) and initiation (block 124) for target storage system discovery/log-in, and procedure selection (block 134) and initiation (block 138) for target volume discovery, are a function of the connection types of the respective host-target connections, 3b and 3n, respectively.

Accordingly, in response to the host-target discovery logic 7b discovering (blocks 108, 116) the connectivity type of the host-target connection path 3b as having the iSCSI/Ethernet connectivity type, the procedure selection (block 120) and initiation (block 124) for target storage system discovery/log-in, and procedure selection (block 134) and initiation (block 138) for target volume discovery, are a function of the discovered iSCSI/Ethernet connectivity type. iSCSI is an Internet Protocol (IP)-based storage networking standard for linking data storage facilities. It provides block-level access to storage devices by carrying SCSI commands (command component) over a TCP/IP (transport component) network. iSCSI is used to facilitate data transfers over intranets and to manage storage over long distances. It can be used to transmit data over local area networks (LANs), wide area networks (WANs), or the Internet and can enable location-independent data storage and retrieval. The protocol allows clients (called initiators) to send SCSI commands to storage devices (targets) on remote servers. It is a storage area network (SAN) protocol, allowing organizations to consolidate storage into storage arrays while providing clients (such as database and web servers) with the appearance of local bus-attached SCSI disks or other storage, when in fact the storage may be connected only by a network.

iSCSI generally uses a special unique name to identify an iSCSI node, either target or initiator. This name is similar to the World Wide Name (WWN) associated with Fibre Channel devices and is used as a way to universally identify the node. Known iSCSI names may be formatted in different ways. The most common is the iSCSI Qualified Name (IQN) Format. A less common format is the Enterprise Unique Identifier (EUI) Format. Accordingly, in one embodiment, the iSCSI/Ethernet connectivity type of the host-target connection path 3b may be identified (blocks 108, 116, FIG. 4) by the host-target discovery logic 7b, by the format of the target node name (either IQN or EUI format, for example) of the storage system 2b, which may be included in the data structure 50 of the storage system 2b. It is appreciated that an iSCSI/Ethernet connectivity type of a host-target connection path 3b may be discovered using other techniques, depending upon the particular application.

The host-target discovery logic 7b automatically selects (block 120) and initiates (block 124) a target storage system discovery/log-in procedure which is intended for the iSCSI/Ethernet connectivity type of the host-target connection path 3b as reported by the storage system 3b. In this example, if the target storage system 2b is not already logged in on the host 1b, the selected target storage system discovery command procedure includes two components, one component which discovers the target storage system 2b on the host 1b, and another component which logs in to the target storage system 2b from the host 1b, as a function of the connectivity type of the host-target connection path 3b. In the iSCSI/Ethernet protocol, an iscsiadm command, for example, may be entered by the target discovery logic 18 (FIG. 2) to discover an iSCSI target which in this example, is the storage system 2b connected to the connection path 3b. Thus, in this example, the host-target discovery logic 7b selects and initiates the iscsiadm tool for the target discovery logic 18 (FIG. 2) to discover the target storage system 2b. It is appreciated that other tools and techniques may be used to discover an iSCSI target storage system, depending upon the particular application.

The host-target discovery logic 7b also automatically selects (block 134) and initiates (block 138) a target volume discovery procedure which is intended for the iSCSI/Ethernet connectivity type of the host-target connection path 3b as reported by the storage system 3b. In this example, once the target storage system 2b is logged in on the host 1b, the volume itself may be discovered using appropriate volume discovery procedures on the host 1b, as a function of the discovered connectivity type of the host-target connection path 3b. In the iSCSI/Ethernet protocol, the target volumes of the discovered iSCSI target, which are attached to the host 1b, may be discovered by the target discovery logic 18 (FIG. 2) of the host 1b in a manner similar to that described above in connection with host 1a and the SCSI/FC type connection path 3a. For example, the file system may be searched or other host discovery commands may be utilized for discovery of volumes on storage devices. For FC connectivity, a rescan command may be utilized. Thus, the target volume discovery tool or procedure selection depends upon the connectivity type of the host-target connection path 3b. Having discovered the volumes attached to the host 1b, the host 1b maps the discovered attached volumes to the host 1b and initiates use of the mapped volumes for I/O operations.

Automated operations for the host-target discovery logic 7n may be performed for associated host or host clusters 1n in a manner similar to that described above in connection with host-target discovery logic 7a and 7b. However, the procedure selection (block 120) and initiation (block 124) for target storage system discovery/log-in, and procedure selection (block 134) and initiation (block 138) for target volume discovery, are a function of the connection type of the respective host-target connection 3n, that is, the NVMe/Me/FC connectivity type. Accordingly, in response to the host-target discovery logic 7n discovering (blocks 108, 116) the connectivity type of the host-target connection path 3n as having the NVMe/FC connectivity type, the procedure selection (block 120) and initiation (block 124) for target storage system discovery/log-in, and procedure selection (block 134) and initiation (block 138) for target volume discovery, are a function of the discovered NVMe/FC connectivity type. In this example, if the target storage system 2n is not already logged in on the host in, the selected target storage system discovery command procedure includes two components, one component which discovers the target storage system 2n on the host 1n, and another component which logs in to the target storage system 2n from the host 1n, as a function of the connectivity type of the host-target connection path 3n.

In this manner, the preconfigured target storage system discovery/log-in command procedure selected by the host-target discovery logic 7n may be readily triggered by the host-target discovery logic 7n and executed by a CSI node plug-in of the host 1n without incurring delays in preconfiguring or loading and installing a new target storage discovery command procedure in response to a change in connection path connectivity type, for example. Thus, in response to the running of the selected target storage system discovery/log-in procedure which has been preconfigured for the NVMe/FC connectivity type, the host in discovers any storage systems connected to the host via the NVMe/FC type connection path. As noted above in connection with the connectivity type SCSI/FC, for a Fibre Channel transport protocol having a Fibre Channel-Arbitrated Loop (FC-AL) initiator, an initiator such as a host in uses the LIP (Loop initialization Protocol) to interrogate each device port for its WWN (World Wide Name). In this example, the host 1n discovers the storage system 2n connected to the host in by the connection path 3n having the NVMe/FC connectivity type as determined by the host-target discovery logic 7n as described above.

In this example, Fibre Channel is a Storage Area Network protocol which encapsulates the NVMe protocol. In various NVMe transport protocols, there is an automated process for the discovery of NVMe devices and their identifications. In the NVMe/FC protocol, a nvme connect tool may be utilized to create a transport connection to a remote system and create an NVMe over FC controller to discover an NVMe target which in this example, is the storage system 2n connected to the connection path 3n. In addition, an nvme discover tool such as nvmeadm command may be used. Thus, in this example, the host-target discovery logic 7n selects and initiates the appropriate nvme tools to discover the target storage system 2n. It is appreciated that other tools and techniques may be used to discover an NVMe target storage system, depending upon the particular application.

The host-target discovery logic 7n also automatically selects (block 134) and initiates (block 138) a target volume discovery procedure which is intended for the NVMe/FC connectivity type of the host-target connection path 3n as reported by the storage system 2n. In this example, once the target storage system 2n is logged in on the host 1n, the volume itself may be discovered using appropriate volume discovery procedures on the host 1n, as a function of the discovered connectivity type of the host-target connection path 3n. In the NVMe/FC protocol, the target volumes of the discovered NVMe target, which are attached to the host 1n, may be discovered by the target discovery logic 18 (FIG. 2) of the host 1n by executing a tool such as /dev/nvmeXnY. Thus, in this example, the host-target discovery logic 7n also automatically selects (block 134) and initiates (block 138) /dev/nvmeXnY as a target volume discovery procedure which is intended for the NVMe/FC connectivity type of the host-target connection path 3n as reported by the storage system 2n. In a Linux operating system, the discovered volumes appear as different block devices using the /dev/nvmeXnY device naming scheme. Thus, the target volume discovery tool or procedure selection depends upon the connectivity type of the host-target connection path 3n. Having discovered the volumes attached to the host in, the host in maps the discovered attached volumes to the host in and initiates use of the mapped volumes for I/O operations.

In the illustrated embodiment, the host-target discovery logic 7a, 7b . . . 7n, the target discovery logic 18 and the host-volume management logic 48 are described in one embodiment as software stored in a memory and executed by a CPU or processor. However, it is appreciated that the logic functions of these components may be implemented as hardware, software, firmware or combinations of one or more thereof, depending upon the particular application.

It is seen from the above that automated host-target discovery logic in one aspect of the present description, automatically discovers the connectivity type for a connection path, and selects and initiates preloaded and preinstalled target discovery procedures which are appropriate for the discovered connectivity type. As a result, mapping a target volume of the target storage system which is connected to the host, may be facilitated, reducing or eliminating delays which may have otherwise resulted from the change in connectivity type. In this manner, efficiency of the computing system may be improved. Other aspects and advantages may be realized, depending upon the particular application.

Figure 5:
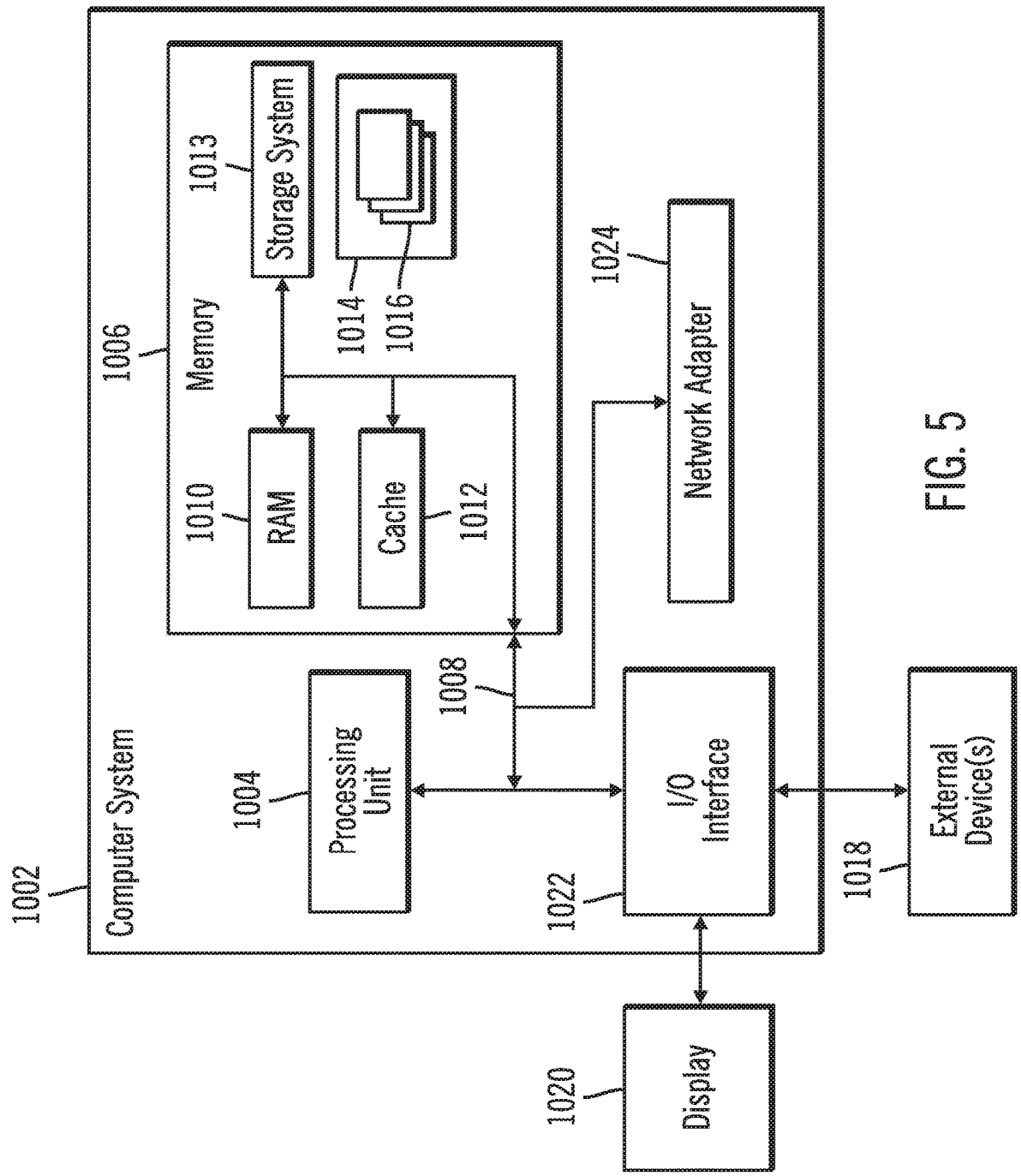
FIG. 5 illustrates a computer embodiment employing connectivity type detection for a data storage system in accordance with the present description.

The computational components of the figures may each be implemented in one or more computer systems, such as the computer system 1002 shown in FIG. 5. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product configured for use with a computer system having a host, and a data storage system having a storage controller and at least one storage unit controlled by the storage controller and configured to store data, wherein the computer system has a processor, and wherein the computer program product comprises a computer readable storage medium having program instructions embodied therewith, the program instructions executable by a processor of the computer system to cause computer system operations, the computer system operations comprising:

in response to a first discovery request, connectivity type discovery logic coupled to a first storage system which is in turn coupled to a host by a first host-target connection having a connectivity type, discovering the connectivity type including a transport protocol and command protocol of the connectivity type of the first host-target connection; and target discovery logic associated with the host, discovering the first storage system as a function of a first discovered connectivity type of the first host-target connection wherein discovering the first storage system includes discovering the first storage system as a target storage system on the host and logging in to the first storage system from the host, as a function of the transport protocol and command protocol of the first discovered connectivity type of the first host-target connection.

2. The computer program product of claim 1 wherein the computer system operations further comprise connectivity type discovery logic selecting and initiating a target storage system discovery procedure for the target discovery logic, as a function of the first discovered connectivity type of the first host-target connection.

3. The computer program product of claim 1 wherein the computer system operations further comprise target discovery logic associated with the host, discovering a first target volume on a discovered first storage system as a function of the first discovered connectivity type of the first host-target connection.

4. The computer program product of claim 1 wherein the computer system operations further comprise connectivity type discovery logic selecting and initiating a target volume discovery procedure for the target discovery logic, as a function of the first discovered connectivity type of the first host-target connection.

5. The computer program product of claim 1 wherein the computer system operations further comprise connectivity type discovery logic connecting to the host and the first storage system and providing a command interface to selectively initiate discovery commands on the host and selectively initiate discovery commands on the first storage system.

6. The computer program product of claim 1 wherein the first discovered connectivity type of the first host-target connection is one of Small Computer System Interface (SCSI)/Fibre Channel (FC), Internet SCSI (iSCSI)/Ethernet, and NonVolatile Memory express (NVMe)/FC.

7. The computer program product of claim 1 wherein connectivity type discovery logic initiating a selected target storage system discovery procedure for the target discovery logic, includes issuing commands over a connection between the connection type discovery logic and the host.

8. The computer program product of claim 1 wherein connectivity type discovery logic initiating a selected target volume discovery procedure for the target discovery logic, includes issuing commands over a connection between the connection type discovery logic and the host.

9. A method, comprising:
in response to a first discovery request, connectivity type discovery logic coupled to a first storage system which is in turn coupled to a host by a first host-target connection having a connectivity type, discovering the connectivity type including a transport protocol and command protocol of the connectivity type of the first host-target connection; and
target discovery logic associated with the host, discovering the first storage system as a function of a first discovered connectivity type of the first host-target connection wherein discovering the first storage system includes discovering the first storage system as a target storage system on the host and logging in to the first storage system from the host, as a function of the transport protocol and command protocol of the first discovered connectivity type of the first host-target connection.

10. The method of claim 9 further comprising connectivity type discovery logic selecting and initiating a target storage system discovery procedure for the target discovery logic, as a function of the first discovered connectivity type of the first host-target connection.

11. The method of claim 9, further comprising:
target discovery logic associated with the host, discovering a first target volume on a discovered first storage system as a function of the first discovered connectivity type of the first host-target connection.

12. The method of claim 11, further comprising:
connectivity type discovery logic selecting and initiating a target volume discovery procedure for the target discovery logic, as a function of the first discovered connectivity type of the first host-target connection.

13. The method of claim 9 further comprising:
connectivity type discovery logic connecting to the host and the first storage system and providing a command interface to selectively initiate discovery commands on the host and selectively initiate discovery commands on the first storage system.

14. The method of claim 9 wherein the first discovered connectivity type of the first host-target connection is one of Small Computer System Interface (SCSI)/Fibre Channel (FC), Internet SCSI (iSCSI)/Ethernet, and NonVolatile Memory express (NVMe)/FC.

15. The method of claim 9 wherein connectivity type discovery logic initiating a selected target storage system discovery procedure for the target discovery logic, includes issuing commands over a connection between the connection type discovery logic and the host.

16. The method of claim 9 wherein connectivity type discovery logic initiating a selected target volume discovery procedure for the target discovery logic, includes issuing commands over a connection between the connection type discovery logic and the host.

17. A computer system, comprising:
a host;
a first storage system having a storage controller and at least one storage unit controlled by the storage controller and configured to store data;
a first host-target connection having a connectivity type and coupling the host to the first storage system;
connectivity type discovery logic coupled to a first storage system and configured to, in response to a first discovery request, discover the connectivity type including a transport protocol and command protocol of the connectivity type of the first host-target connection; and
target discovery logic associated with the host and configured to discover the first storage system as a function of a first discovered connectivity type of the first host-target connection wherein discovering the first storage system includes discovering the first storage system as a target storage system on the host and logging in to the first storage system from the host, as a function of the transport protocol and command protocol of the first discovered connectivity type of the first host-target connection.

18. The computer system of claim 17 wherein the connectivity type discovery logic is further configured to select and initiate a target storage system discovery procedure for the target discovery logic, as a function of the first discovered connectivity type of the first host-target connection.

19. The computer system of claim 17 wherein the target discovery logic associated with the host, is further configured to discover a first target volume on a discovered first storage system as a function of the first discovered connectivity type of the first host-target connection.

20. The computer system of claim 17 wherein the connectivity type discovery logic is further configured to select and initiate a target volume discovery procedure for the target discovery logic, as a function of the first discovered connectivity type of the first host-target connection.

21. The computer system of claim 17 wherein the connectivity type discovery logic has connections coupling the connectivity type discovery logic to the host and to the first storage system and wherein the connectivity type discovery logic is further configured to provide a command interface to selectively initiate discovery commands on the host and selectively initiate discovery commands on the first storage system.

22. The computer system of claim 17 wherein the first discovered connectivity type of the first host-target connection is one of Small Computer System Interface (SCSI)/Fibre Channel (FC), Internet SCSI (iSCSI)/Ethernet, and NonVolatile Memory express (NVMe)/FC.

* * * * *